UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY MATERIAL.

1,078,525.  Specification of Letters Patent.  Patented Nov. 11, 1913.

No Drawing.  Application filed April 26, 1912.  Serial No. 693,496.

*To all whom it may concern:*

Be it known that I, FRANK J. TONE, a resident of Niagara Falls, in the county of Niagara and State of New York, have invented a new and useful Refractory Material, of which the following is a full, clear, and exact description.

My invention relates to refractory materials, particularly those used for furnace linings and metallurgical structures; and the object of the invention is to provide a new and desirable form of silicon carbid which will utilize its high refractory power and remove the objection heretofore present, of low resistivity to heat conduction.

The refractory properties of silicon carbid have long been known and it has had a considerable application as furnace lining both in the form of bricks, rammed, or otherwise applied solid linings. But notwithstanding its infusible and refractory nature, its low thermal resistivity has been a great objection to its use especially in certain applications; it being a good conductor of heat as compared with fire brick. Recent published investigations give a value of 10.3 thermal ohms per cubic centimeter for the resistivity of silicon carbid brick at 1000 C., and a value of 57 thermal ohms for ordinary fire brick at the same temperature. The conduction losses in a silicon carbid lining would therefore be over five times as great as in a fire brick lining. In using silicon carbid furnace linings it has therefore been proposed to prevent the loss of heat by suitable insulating material. But this combination has presented difficulties because silicon carbid linings have their chief application where temperature or other conditions are most extreme and where many of the well known insulating materials such as asbestos, or silicon monoxid, undergo a change at high temperatures and lose much of their insulating value. I have found that I can overcome this difficulty by forming a lining in which the working portion, exposed to high temperature and requiring stability and strength, is formed of silicon carbid of high refractability and low thermal resistivity; and by backing up this layer with silicon carbid of a form which, although lacking in strength and refractability as compared with the other portion, has very high thermal resistivity. For the first named exposed or working portion I may use bricks made of dense silicon carbid in accordance with U. S. Patent No. 992,698, granted to me May 16th, 1911, in which a mixture of silicon carbid and carbon is subjected to the action of silicon-containing vapors at sufficiently high temperature to convert the brick into dense silicon carbid. For the second named portion of the lining I prefer to use the porous form of silicon carbid described in the patent of myself and Edmund S. Smith, No. 1,058,800, issued April 15, 1913, entitled Silicon carbid articles and method of making the same, in which porous carbon is subjected at high temperature to silicon-containing vapors and converted into porous silicon carbid of low apparent density and apparently non-crystalline structure. I may also use other materials having the desired properties in which silicon carbid is one of the constituents, for example the material described in my pending application No. 681,623, filed March 4th, 1912, which is thought to be a solid solution of silicon carbid in silica, and is characterized by low apparent density and high thermal resistivity.

When desired for mechanical or other reasons, my composite silicon carbid lining may be supported or backed up by ordinary means such as the steel furnace shell or by walls of less refractory bricks.

The advantages of my invention result from the use of the two grades or species of silicon carbid, namely the dense grade giving the higher infusible and refractory properties combined with a backing of the porous carbid having high thermal resistivity. This combination overcomes the objection to the use of dense silicon carbid as a refractory material and at the same time overcomes the difficulties in using other backing up materials in high temperatures.

The two silicon carbid materials may be produced in any desirable way and by any desirable apparatus. It may be found economical for example for use in certain refractory structures to produce the two materials in one and the same article in a composite form. In such case the working portion would be composed of the dense silicon carbid with a backing of porous silicon carbid. The article to be silicidized would first be formed having its respective portions so constituted that one portion would be suitable for conversion into dense silicon carbid and the other portion suitable for conversion into porous silicon carbid. The article would then be placed in the silicidizing zone of the furnace so that the first portion would be subjected to a temperature sufficient to convert it into dense silicon carbid, and the second portion so placed that it would be subjected to a lower range of temperature sufficient only to convert it into porous silicon carbid.

I claim:—

1. Refractory material, comprising a layer of dense silicon carbid and a layer of porous silicon carbid of relatively high thermal resistivity.

2. Refractory material, comprising a layer of dense silicon carbid, and a contiguous layer of porous silicon carbid of low apparent density and high thermal resistivity.

3. A refractory structure consisting of a layer of silicon carbid of high refractability and mechanical strength, and of low thermal resistivity, and a contiguous layer of silicon carbid of porous structure, low apparent density and high thermal resistivity.

4. A refractory furnace lining having an exposed working face of silicon carbid of high refractability and low thermal resistivity, thermally insulated by silicon carbid of low apparent density and high thermal resistivity.

In testimony whereof, I have hereunto set my hand.

FRANK J. TONE.

Witnesses:
 EARLE H. FINNEGAN,
 J. RAFUSE.